Patented Aug. 30, 1932

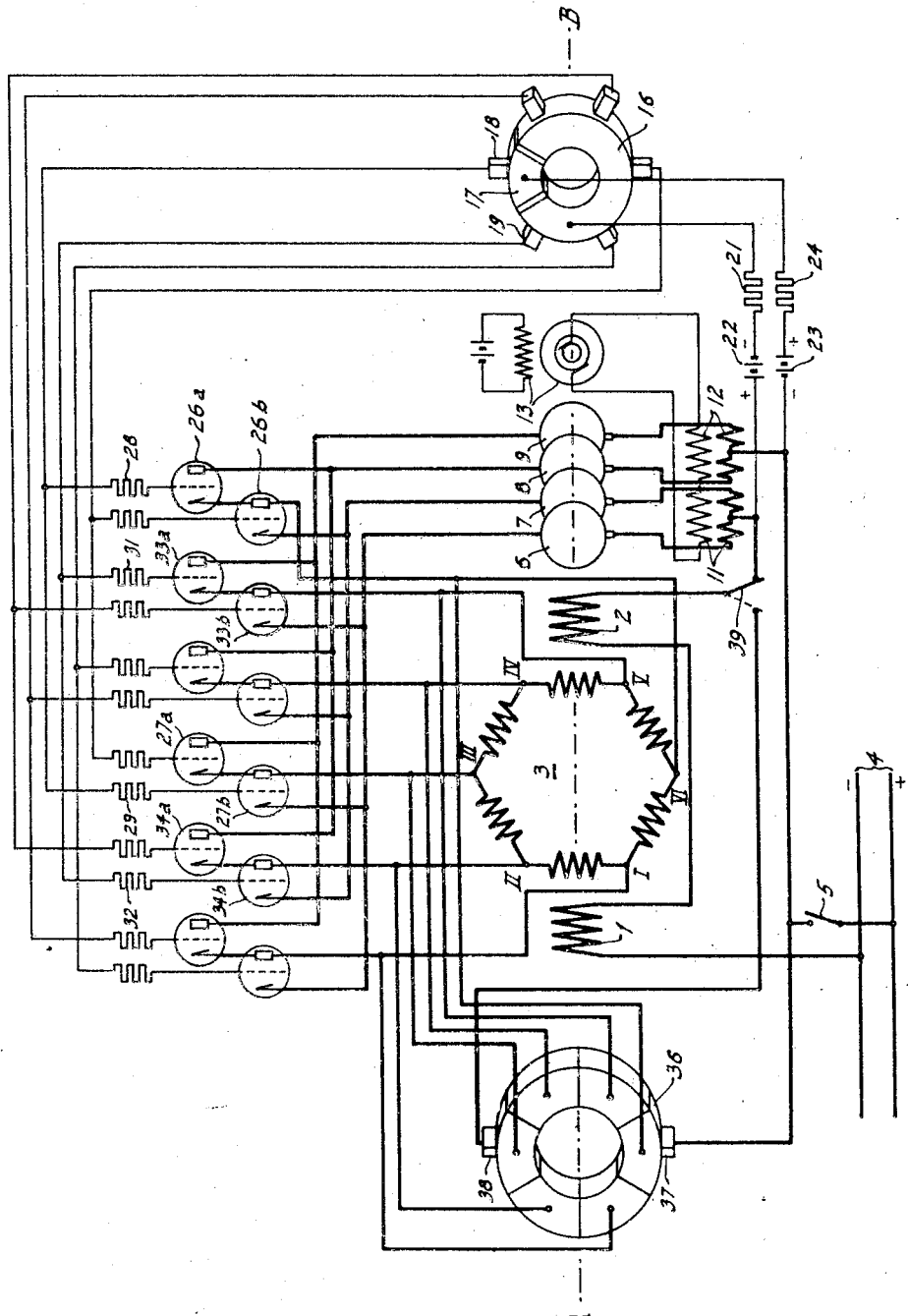

1,873,966

UNITED STATES PATENT OFFICE

ERWIN KERN, OF WETTINGEN, SWITZERLAND, ASSIGNOR TO AKTIENGESELLSCHAFT BROWN, BOVERI & CIE., OF BADEN, SWITZERLAND

DIRECT CURRENT MOTOR CONTROL SYSTEM

Application filed January 28, 1930, Serial No. 424,056, and in Germany January 28, 1929.

This invention relates to improvements in direct-current motors without commutators in which the current supply to the motor is controlled by electric valves.

The present invention is an improvement over my Patent 1,813,056 dated July 7, 1931, entitled Commutation of continuous current which discloses an electric motor structure in which the commutator structure usual heretofore is omitted and the current supply to the motor is controlled by electric valves which are themselves controlled by a distributor in such manner that periodic interruption of the current supply is obtained. The operating voltage is thus not limited by the voltage of each segment and therefore by the number of segments available in the usual commutator structure.

It has been found however that a motor of the character above mentioned is difficult to start properly for the reason that the current is commutated by an alternating current superposed on the direct-current supply, which alternating current is furnished by an alternating current generator which must be either mounted on the motor shaft or driven at a rate proportional to the speed of the shaft. When the motor is started, the generator output is very low so that the alternating current voltage supplied is not sufficient to provide for the proper periodic interruption of the direct current.

It is, therefore, among the objects of the present invention to provide means for starting an electric valve controlled motor without the use of an auxiliary alternating current source.

Another object of the invention is to provide an electric valve controlled motor with a commutator structure which will function only during the starting period of the motor.

Another object of the invention is to provide an electric valve controlled motor with a commutator structure which will avoid the necessity for use of the valve commutating system during the starting operation of the motor.

Another object of the invention is to provide an electric valve controlled motor with a commutator structure having the brushes connected in parallel with the valve commutating system to permit use of the former during starting and use of the latter during running operation of the motor.

Objects and advantages, other than those above set forth, will be apparent from the following description when read in connection with the accompanying drawing which diagrammatically shows one embodiment of the invention.

Referring more particularly to the drawing by characters of reference, the reference numerals 1 and 2 designate the several portions of the stationary field windings and the reference numeral 3 designates the rotating armature of a direct current motor which is supplied with current from a direct current line 4 through a main switch 5. The armature winding 3 is shown as being divided into only six sections; although it is evident that it may be divided into any number of sections; which are connected at point I, point II, point III, point IV, point V and point VI. It is also evident that the motor may be constructed with a fixed armature and a rotating field, the other portions of the structure to be described hereinafter being correspondingly movable or stationary so as to maintain the mechanical relations thereof.

A plurality of slip-rings 6, 7, 8 and 9 are mounted on the motor shaft indicated by the line A—B and are connected through brushes with the secondary windings of transformers 11 and 12, the primary windings of which are connected with and supplied with alternating current of a suitable frequency from an alternating current generator 13 mounted on the shaft A—B or driven by other suitable means at a speed proportional to the speed of such shaft. The primary windings of the transformers 11 and 12 are connected in series to obtain absolute equality of the alternating current amplitude. A distributor, divided into two segments 16 and 17, is mounted on the motor shaft A—B in such position as to permit successive contact with the segments 16 and 17 by brushes 18 and 19. The distributor segment 16 is connected through a resistance 21 to the negative side of a battery 22 and with the slip-rings 6 and 7 through the secondary winding of the transformer 11. The segment 17 of the distributor is connected through a resistance 24 with the positive side of a battery 23 which is connected with secondary winding of the transformer 12 and through such secondary winding with the slip-rings 8 and 9.

The different connection points, designated by the Roman numerals, of the armature winding 3, are connected with pairs of double vapor or gas-filled grid controlled electric valves as shown at 26a, 26b and 27a, 27b and the control grids of the valves 26a and 27b are connected through resistances 28 and 29 with brush 18 on the distributor. Brush 19 is connected through resistances 31 and 32 with the grids of valves 33a and 34b of pairs of valves such as above mentioned. It will be seen that each of the armature winding connection points is connected with the anode of one of the pairs of valves and that the control of grids of each of the valves are connected with the brushes in contact with the distributor. Each pair of valves is so constructed that one of the valves of each pair functions to allow current to flow only into the armature while the other valve of the pair permits current to flow only out of the armature winding.

A commutator 36, divided into a plurality of segments as is usual, is mounted on the motor shaft A—B at the end thereof opposite that carrying the slip-rings 6, 7, 8 and 9, the alternator 13 and the distributor 16, 17. Brushes 37 and 38, arranged to contact with the commutator 36, may be connected in series with the motor field windings 1 and 2 through a switch 39.

In operation, switch 5 is closed and switch 39 is moved to the dotted line position shown in the drawing thereby connecting the field windings 1 and 2 in series with the source of direct current 4 through commutator 36. The field windings are thus fully energized and the motor armature is quickly brought up to the proper running speed. At running speed of the motor, the slip-rings, the alternator and the distributor will also, of course, be rotated at the required speed. As soon as running speed has been reached, switch 39 is reversed into the full line position shown thereby disconnecting commutator 36 and connecting the circuits, to be described hereinafter, for continued operation.

Assuming that the armature is in the position shown in the drawing at the moment switch 39 is reversed to the full line position, the device passes through a constantly recurring cycle of operation which brings each Roman numeral designated connection point successively into the same relation with the stationary field windings. A circuit is completed from the direct current line 4 through the secondary winding of transformer 12, over slip-ring 8, through valve 26a to point VI of the winding. The current flows in both directions from point VI to point III, passes through valve 27b, over slip-ring 6, through the secondary winding of transformer 11, and flows through fields 2 and 1 back to the line 4. The grids of valves 26a and 27b have a positive bias impressed thereon from the battery 23 through the resistance 24 over segment 17 and brush 18 of the distributor and through resistances 28 and 29. Current can thus flow through these valves. All of the other valve grids are supplied with a negative bias from the battery 22 through the resistance 21 to segment 16 and brush 19 of the distributor and through resistances 31 and 32. Flow of current through such negatively biased tubes or valves is thus prevented.

During the next moment of operation, the armature and the distributor will have rotated sufficiently to bring point V of the armature winding midway between the location shown in the drawing and that shown for point VI. The brushes 18 and 19 will then be in contact with segment 17 due to the rotation of the distributor. A circuit is then completed from the direct current supply line 4 to the secondary winding of the transformer 12, over the slip-rings 8 and 9, through valves 26a and 33a, to the armature winding connection points V and VI. The current will flow from the connection points V and VI through the winding 3 in both directions to the connection points II and III and will leave the winding through the valves 27b and 34b, over the slip-rings 6 and 7, through the secondary winding of transformer 11, will pass through the fields 2 and 1 and the switch 5 back to the line 4. The grids of the valves 26a, 27b, 33a and 34b are thus supplied with a positive bias from the battery 23 through the distributor segment 17 and over the brushes 18 and 19 contacting therewith. All of the other valve grids have a negative bias impressed thereon through the circuit as described in the preceding paragraph.

During the next moment of rotation of the armature and of the distributor, point V will have been brought to the position shown in the drawing for point VI and the distributor will have been so rotated that brush 19 will be in contact with segment 16 on which a negative bias is impressed from the battery 22. A circuit is then completed from the direct current supply line 4 through the secondary winding of transformer 12, over the slip-ring 9 through the valve 33a to point V of the armature winding, from which current will flow through the winding 3 in both directions to the connection point II thereof. Current will leave the armature winding through the valve 34b, over the slip-ring 7, through the secondary winding of the transformer 11, and will flow through fields 2 and 1 and over switch 5 back to the direct current supply line 4. The grids of the valves 33a and 34b have a positive bias impressed thereon and all of the other valve grids have a negative bias impressed thereon with respect to the cathodes of the valves as above described.

It will be seen that, in the first position considered, the grids of valves 26a and 27b are positive and that the grids of valves 33a and 34b are negative; while in the second position considered, the grids of valves 33a and 34b are positive, while the grids of valves 26a and 27b are negative. But the current continues to flow through the valves 26a and 27b until the voltages induced in the secondary windings of transformers 11 and 12 by the alternator 13 is balanced by the difference of counter-electro-motive force produced in the two circuits by the armature 3. Once the current is interrupted, the current in the first circuit cannot pick up again until the grids of the valves 26a and 27b are again positive.

The present invention therefore provides a system in which an electric valve controlled motor is quickly brought up to speed by the use of the usual commutator thereby avoiding the poor starting characteristics of the valve controlled motor and is operated by the use of electric valves thereby avoiding the well-known difficulties of commutation.

Although but one embodiment of the present invention has been illustrated and described, it will be apparent to those skilled in the art that various changes and modifications may be made therein without departing from the spirit of the invention or from the scope of the appended claims.

The invention claimed is:

1. In a system for commutating the current supplied to a direct current motor, a motor having an armature winding divided into a plurality of connected sections arranged upon a shaft and field windings arranged adjacent the armature winding, a source of direct current supply, electric valves connected between the sections of the armature winding to commutate the current supplied thereto during full speed operation of said motor; means for controlling the operation of said valves, means for commutating the current supplied to the said armature winding during starting operation of said motor, and a switch to connect said current source with said valves and with said commutating means.

2. In a system for commutating the current supplied to a direct current motor, a motor having an armature winding divided into a plurality of connected sections arranged upon a shaft and field windings arranged adjacent the armature winding, a source of direct current supply, electric valves connected between the sections of the armature winding to commutate the current supplied thereto during full speed operation of said motor, a source of alternating current, means for superposing said alternating current on the direct current supplied to the field windings, means for controlling the operation of said valves, means for commutating the current supplied to the said windings during starting operation of said motor, and a switch to connect said current source with said valves and said commutating means.

3. In a system for commutating the current supplied to a direct current motor, a motor having an armature winding divided into a plurality of connected sections arranged upon a shaft and field windings arranged adjacent the armature winding, a source of direct current supply, electric valves connected between the sections of the armature winding to commutate the current supplied thereto during full speed operation of said motor, a source of alternating current, a distributor mounted upon the shaft of said motor to control the operation of said valves, means for commutating the current supplied to the said armature winding during starting operation of said motor, and a switch to connect said current source with said valves and with said commutating means.

4. In a system for commutating the current supplied to a direct current motor, a motor having an armature winding divided into a plurality of connected sections arranged upon a shaft and field windings arranged adjacent the armature winding, a source of direct current supply, electric valves connected between the sections of the armature winding to commutate the current supplied thereto during full speed operation of said motor, means for controlling the operation of said valves, a commutator arranged upon the shaft of said motor to commutate the currents supplied to the said armature winding during starting operation of said motor, and a switch to connect said current source with said valves or with said commutator.

In testimony whereof I have signed my name to this specification.

ERWIN KERN.